United States Patent
Hessel et al.

(10) Patent No.: US 6,731,997 B2
(45) Date of Patent: May 4, 2004

(54) METHOD FOR MANUFACTURING HEARING DEVICES

(75) Inventors: Hans Hessel, Benglen (CH); Christoph Widmer, Wernetshausen (CH)

(73) Assignee: Phonak AG, Stafa (CH)

( * ) Notice: Subject to any disclaimer, the term of this patent is extended or adjusted under 35 U.S.C. 154(b) by 159 days.

(21) Appl. No.: 09/916,026

(22) Filed: Jul. 26, 2001

(65) Prior Publication Data

US 2003/0021434 A1 Jan. 30, 2003

(51) Int. Cl.$^7$ ............ G06F 19/00; G06F 17/50; H01R 31/00
(52) U.S. Cl. ............ 700/98; 700/118; 29/896.21; 703/1
(58) Field of Search ............ 700/97, 98, 118; 29/896.21; 703/1

(56) References Cited

U.S. PATENT DOCUMENTS

| | | | | |
|---|---|---|---|---|
| 4,800,636 A | * | 1/1989 | Topholm | 29/896.21 |
| 5,056,204 A | | 10/1991 | Bartschi | |
| 5,455,994 A | * | 10/1995 | Termeer et al. | 29/896.21 |
| 5,487,012 A | | 1/1996 | Topholm | |
| 6,167,138 A | | 12/2000 | Shennib | |
| 6,386,707 B1 | * | 5/2002 | Pellicano | 351/246 |
| 6,402,782 B1 | * | 6/2002 | Sibbald et al. | 623/10 |
| 6,560,499 B1 | * | 5/2003 | Demmer | 700/97 |
| 2001/0005420 A1 | * | 6/2001 | Takagi et al. | 381/312 |
| 2002/0028417 A1 | * | 3/2002 | Chapoulaud et al. | 433/24 |
| 2002/0092029 A1 | * | 7/2002 | Smith | 725/105 |
| 2002/0138237 A1 | * | 9/2002 | Topholm | 703/1 |

FOREIGN PATENT DOCUMENTS

| | | |
|---|---|---|
| BE | 1010200 A3 | 3/1998 |
| WO | 01 52737 A | 7/2001 |

OTHER PUBLICATIONS

Article: "The Selective Laser Sintering Process Third Generation Desk Top Manufacturing" DTM Corporation, Jun. 4, 1990.

Patent Abstracts of Japan, vol. 1997, No. 08, Aug. 29, 1997 & JP 09 103000 A (Rion Co Ltd), Apr. 15, 1997 abstract.

* cited by examiner

Primary Examiner—Leo Picard
Assistant Examiner—Elliot Frank
(74) Attorney, Agent, or Firm—Pearne & Gordon LLP (57) ABSTRACT

A hearing device is manufactured for an individual based on: information about individual audio needs, information about a three-dimensional shape of the application area for the hearing device, information about individual non-audio needs of the hearing aid device, and information about the feasibility of hearing devices; thereby creating a three-dimensional visualization of the device controlled by the individual, and creating data defining the visualized device for subsequent realization of the device.

40 Claims, 5 Drawing Sheets

METHOD FOR MANUFACTURING HEARING DEVICES

The present invention is especially directed on a method for manufacturing in-the-ear hearing devices, but may also be adapted for manufacturing outside-the-ear hearing devices.

Thereby, throughout the description and claims of the present invention the following terms are used as follows:

Definitions

Hearing device

We understand under a hearing device a device for influencing human hearing. Such a hearing device may be a noise-protection device or even a noise-canceling device, a device for improving human hearing in special situations, as e.g. in noisy environment, thereby selectively communicating with one or more than one persons, music listening in a concert hall etc. Further a hearing device may be an earphone as of a hands-free communication system, or may be an earphone for consumer audio appliances.

A hearing device may thereby especially be a hearing aid device in the sense of a therapeutical device for individuals with hearing loss. As was mentioned above, the hearing device may thereby be an outside-the-ear hearing device or and especially an in-the-ear hearing device.

Retailer:

We understand under the expression "retailer" the instance or location, where individuals buy hearing devices.

Audio needs:

The audio needs of an individual may be therapeutical so as to remedy ill hearing behavior to the standard of normal hearing. Audio needs of an individual may also be needs for noise protection, noise canceling, improved hearing in special situations as mentioned above, good hearing characteristics for consumer audio consumption or for hands-free communication etc. Thus, audio needs may be subdivided in therapeutical and non-therapeutical needs.

Application area for a hearing device:

We understand under this term the individual's shape of the area of his head, whereat a hearing device shall be applied to. Such application area may therefore be the ear itself, surrounding areas behind and around the ear, the ear channel with its most individual structure. Thereby, not only the shape defines for the appliance area, but also the kind of structure, be it bony or rather of soft flesh or rather of cartilage, and its appearance, be it the texture or color of the skin. Further, the application area may be co-defined by individual characteristics, as of the production of sweat and cerumen.

Non-audio needs:

Non-audio needs of an individual and in the present context are e.g. needs with respect to aesthetic appearance as of shell colouring of a hearing device, further with respect to pricing, material of the shell surface, especially where in contact with the area of application and under consideration of individual allergies etc.

Up to now especially in-the-ear hearing aid devices are manufactured in that a individual goes to a retailer, as a consultant center. Either the individual brings, in the case of therapeutical audio needs, audiological data about his ill hearing behavior to such retailer, which data have been retrieved e.g. by a specialized medical doctor. In other cases such audiological diagnostic data are retrieved directly at the consultant's or retailer's location as specialized in audiological diagnostics and data evaluation.

At the consultant center, normally the retailer, the individual discusses with the staff his individual needs under consideration of audiologic data, if necessary, or more generically individual's audio needs as a first set of information. There is further discussed, where the hearing device should be placed, in the ear or outside the ear as examples, as well as the aesthetic appearance such a hearing device would probably result in.

Especially in the case of individual's decision to order an in-the-ear hearing device it is necessary to get information about the individual's ear channel structure as a second set of information.

This is normally done by means of taking a mould of the ear channel and then three-dimensionally scanning such mould. Normally, scanning is done by the hearing device manufacturer in context with manufacturing the hearing device. The retailer thereby sends the mould to the manufacturer altogether with further information collected, and the manufacturer returns after construction of the hearing aid device the hardware to the retailer or, more generically, to the consultant center for approval by the individual.

Very often the device is not approved by the individual e.g. due to uncomfortable fitting at the application area or due to aesthetics, which have turned out differently than foreseen in individual's imagination, and also because the manufacturer could not exactly know the real needs of the individual.

The retailer tries to communicate to the manufacturer further information about desired amendments on the device, which are nevertheless not always precise enough to ensure the next run of manufacturing and approval to be a full success. Very often the retailer even tries to satisfy individual's needs by experienced self-overworking of the device, especially by hand-amending the outer shell of the hearing device.

One reason for such frequent forth and back, especially of in-the-ear hearing devices, is imprecise specification of the situation as to how the mould has been taken, i.e. with respect to chin position. Another problem is that due to retailer's own shape amendment of the hearing device the manufacturer is not informed about the finally approved and released shape, so that a replacement necessitates a complicated trial-and-error procedure, especially if the individual changed to another consultant or retailer.

It is an object of the present invention to remedy the cited drawbacks of individual hearing device manufacturing.

This is reached according to the present invention by the method of manufacturing a hearing device individually and for an individual comprising the steps of conceiving the hearing device as a function of first information about individual audio needs;

second information about three-dimensional shape of the application area for the hearing device at the individual;

third information about individual non-audio needs for the hearing device;

fourth information about feasibility of hearing devices, thereby three-dimensionally visualizing the concept of the hearing device computer-based to the individual and amending said concept as visualized controlled by said individual, and freezing data defining for said concept of said device as conceived on approval by said individual or by a person authorized by said individual for subsequent realization of hearing device hardware.

Thereby, just from the beginning of conceiving the hearing device for the individual, be it a new hearing device, or be it, e.g. on repair, or on amending a hearing device, the individual and/or a person authorized by said individual is most involved in the construing procedure in that he monitors on a visualizing screen his personal hearing device as it progresses in construction. The individual may thereby influence by his individual needs and by communicating such needs finally to a conceiving computer system, the construction of the hearing device, and it is only when the individual approves the visualized concept of his future hearing device that the collected data is readied for a hardware production step.

In a first preferred embodiment of the inventive method visualizing and conceiving the hearing device as a function of the above mentioned first to fourth information is performed at one local computer system, i.e. centralized. Thereby, one and the same computer system provides not only for the visualization ability, but also for the computer power for three-dimensionally representing and calculating, e.g. by vector-graphic representation, the hearing device as a function of the said information input to such centralized computer.

In a second and even more preferred embodiment visualizing and conceiving the hearing device, again as a function of the first to fourth information, as mentioned above, is realized at more than one decentralized computer system, which systems are in mutual communication. Once the visualizing data are computed for mere visualization, there suffices a slave computer as a laptop, the screen of a PDA or even the screen of a handy to visualize the conceived hearing device to the individual.

In a further preferred mode at least two decentralized computer systems are in real-time communication, so that at each of the computers there may sit a staff member who is specialized in a specific topic, as e.g. in shell-making, in functional module-assembling, in interpreting audiological data etc.

Thus, one or more than one expert join in with the individual to conceive his personal hearing device.

Also it is absolutely possible that the individual, e.g. at home, conceives his future hearing device on a visualizing screen, thereby preferably in online communication with consulting experts at one or more than one computers systems or even in oral phone communication with a consultant, in a most preferred embodiment of the present invention, visualizing the hearing device under construction and individual's controlling is performed at the location of a consultant. Such a consultant is most preferably a hearing device retailer.

In a further preferred embodiment the first information, which is directed on audio needs of the individual, is subdivided in a subset of first information, namely about therapeutical audio needs of the individual, which information may hardly be retrieved by the individual himself. The second subset of this first information, namely about non-therapeutical audio needs, as in the case of noise protection, noise canceling etc., may well be retrieved from the individual himself, so that this second subset of information for conceiving the hearing device is directly communicated from the individual lastly to the conceiving and visualizing computer systems.

Thereby, in a preferred mode of operation at least a part of the first information, thus especially about therapeutical needs, is retrieved at a place, which is remote from visualizing the hearing device concept to the individual. Nevertheless, this part or another part of the first information may clearly be retrieved also at the place of visualization. E.g. audiological data may be retrieved at the retailer's place as the place of the consultant, at which the individual is present when conceiving his hearing device.

Additionally or alternatively at least a part of the first information may also be retrieved from a data bank, which has been established from data of a previous hearing device of the individual. This will especially be the case if an existing hearing device of the individual is to be repaired or only parts thereof, as e.g. the shell is to be replaced.

In a further preferred mode of the inventive method the second information, i.e. the information about three-dimensional shape of the application area of the hearing device at the individual, is retrieved by taking a mould of the application area. Thereby, in a further preferred mode such mould-taking is performed either at the specialized mould center or at the location of the consultant. Thereby again, the consultant may preferably be the retailer.

Departing from such mould this mould is preferably three-dimensionally scanned, which further preferably is performed either at a mould-scanning center or at the center, where the mould has been taken or at the location of a consultant, especially of a retailer. Latter especially then, when also mould-taking has been performed at the consultant's place.

In another preferred mode of operating the inventive method, the second information is retrieved by in-vivo scanning three-dimensionally the individuals application area. Again this is preferably performed in an in-vivo scanning specialized center or at a consultant's place, which again may be advantageously the hearing device retailer. With respect to this second information too, it may be retrieved from a data bank, especially if the new hearing device to be conceived is based on an existing hearing device of the same individual.

In a further preferred mode of operation the fourth information, namely information about, generically spoken, feasibility of a desired hearing device, especially under technical aspects, is retrieved from at least one hearing device manufacturer. Thereby, this information is further preferably stored in a data bank, which may be located anywhere, but has preferably to be addressable from the hearing device conceiving computer system. Preferably such a data bank is nevertheless located at the hearing device manufacturer or at a consultant center, which again may be the hearing device retailer.

Once and according to the present invention the data defining for the concept of the device as conceived and approved by the individual is frozen, this data is transmitted to a hearing device hardware manufacturing center. Again such manufacturing center may be a hearing device manufacturer or may be located at a consultant center, especially if there is provided a stock of modules for constructing different hearing devices as well as for instance the ability of shell-making, e.g, by a procedure as known from rapid prototyping and as e.g. disclosed in the WO 01/05207, which is incorporated in the present description by reference and specifically with respect to shell-making.

Again, such consultant center may preferably be at a retailer's location, so that in a preferred mode of operation of the inventive method in fact all steps for data retrieving and hearing device hardware preparing might be performed there.

The said manufacturing center, which receives the frozen data, according to an approved hearing device concept, checks, whether a hardware hearing device may or may not be construed, which exactly matches the said frozen data. Whenever such a hearing device, which exactly matches the frozen conceptual data may not be constructed at the manufacturing center, there is conceived a novel set of data of a hearing device which may be realized and wherefrom the data matches closest the frozen data.

Thereby a hardware hearing device is not yet constructed, but first the set of data for a feasible hearing device is retrieved, the data therefrom, as was said, matching the frozen data as closest as possible, possibly with a priority setting, about which of the first to fourth information according data should match closest and which are less critical.

Then these data are retransmitted finally to the individual and visualized, so that the individual may monitor on screen what a hearing device will look like, which is in fact proposed by the manufacturing center and which does not exactly match his own approved proposal.

The individual may again in a preferred mode amend such proposition up to approval and thus a new set of frozen data is retrieved and retransmitted to the manufacturing center.

Especially if the frozen data transmitted to the manufacturing center do match with the data of a feasible hearing device or do only neglectably differ therefrom, then at a manufacturing center there is produced hardware, be it a dummy of the hearing device or a functional hearing device.

In a preferred further mode such hardware, namely the dummy and/or the functional hearing device, is transmitted to the individual and thereby, practically in parallel, also the data defining for such hardware, so that the individual may try on the hardware on one hand and on the other hand get three-dimensionally the hardware, which is just on try-on displayed on the visualizing screen. There the individual may again enter amendments, if necessary, up to approval.

Such re-amended data is then retransmitted to the manufacturing center for definite (hopefully) construction of the hearing device. The hardware, which has been transmitted to the individual for try-on, is either transmitted to the manufacturing center, or, especially in case of a dummy, is either kept for further comparative try-ons after newly constructed hardware has been received or is dispatched.

The invention under all its aspects shall now be described with the help of figures. They show.

1. Conception of a New Hearing Device or Recovering/amending an Existing Hearing Device In FIG. 1 there is shown, by means of a schematic signal or communication flow/functional block diagram, the basic conceiving step for the inventive hearing device manufacturing, repair or retrofitting method.

Figure 1:
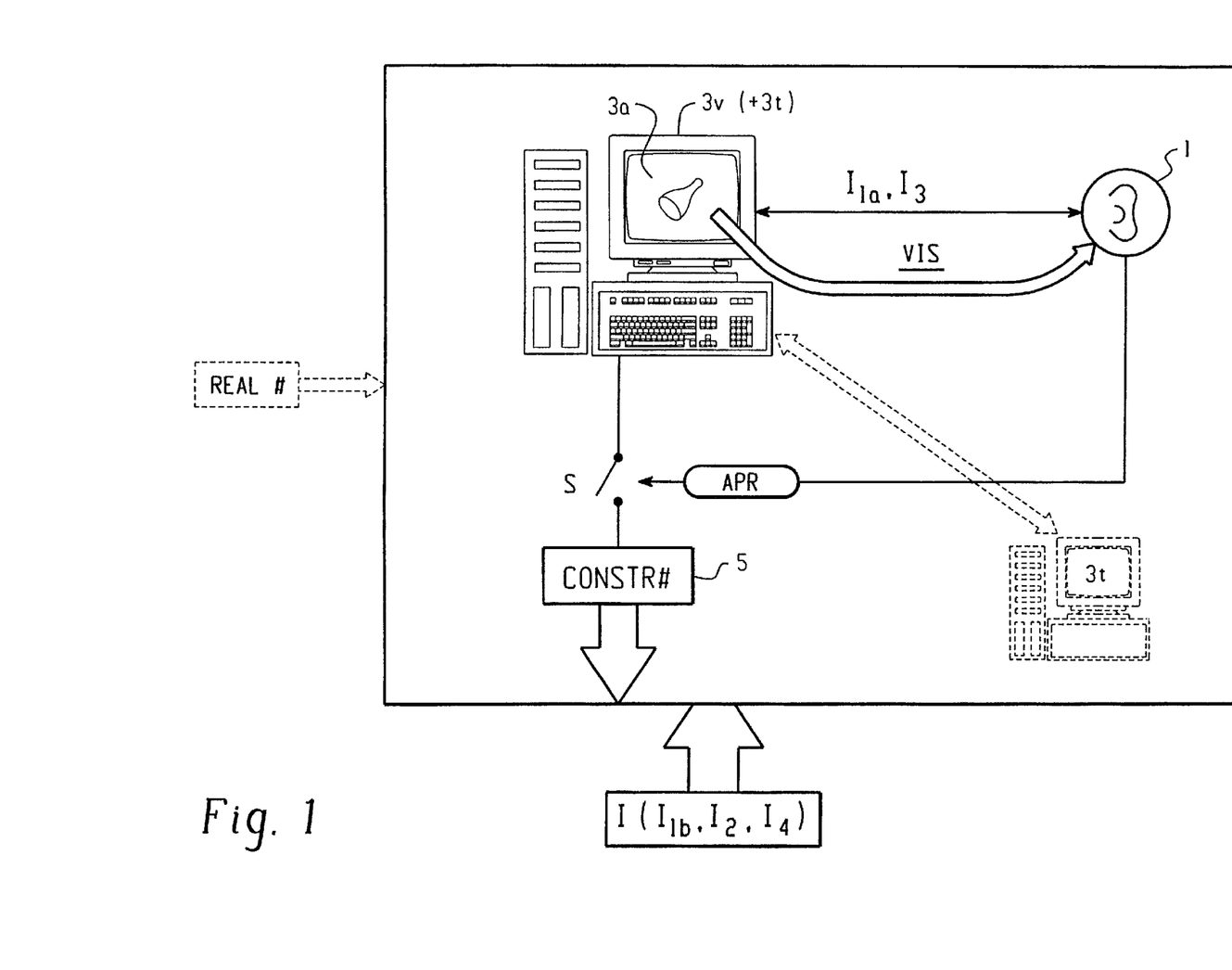
FIG. 1: in a schematic signal and communication flow/functional block diagram a first embodiment of the inventive method.

An individual 1, who would like to order a new hearing device, or who would like to repair e.g, a broken hearing device, or who would like to amend his existing hearing device due to needs which have changed between conceiving his existing hearing device and present time, stands in visual communication VIS with a display 3a of a displaying computer $3_v$.

For conceiving the hearing device the following categories of information are needed:

First information $I_1$ about the individuals audio needs. These needs may be therapeutical needs, which result from diagnostic, audiological examination and may be summarized under the term "hearing loss". The first information may comprise or consist of such "hearing loss" data, especially if the hearing device to be conceived is a therapeutical device in the sense of a hearing aid device. In other cases, the first information comprises or consists of non-therapeutical audio information. e.g. where the hearing device to be conceived is a noise-protection device, a hearing device of a headset, e.g. for telephone applications, a headphone as for consumer audio application or is a hearing device for improving normal hearing in special situations, as in noisy environment, in concert halls etc. In any case, when conceiving a new hearing device, this first information $I_1$ must be taken under consideration.

Second information $I_2$ about the three-dimensional shape of the application area of the individual for the hearing device. We understand under the individual application area for the hearing device that area, where the hearing device shall be individually applied and thus especially the ear channel shape for in-the-ear hearing devices or the area surrounding one individual's ear for outside-the-ear hearing devices.

Third information $I_3$ about additional individual, not audio needs for the hearing device. Such additional needs may e.g. be pricing to an individually set maximum level or a range between a minimum and a maximum price etc., aesthetic appearance of the hearing device to be conceived per se and when applied to the individual's ear, further individual inconsistencies of skin with respect to certain materials possibly leading to inflammation etc.

The fourth information $I_4$ deals about technical feasibility of hearing devices. It comprises e.g. all information about modules to be possibly incorporated in a hearing device, as microphone modules, loudspeaker modules, digital processing units, operating switches, remote controls, battery modules, shell shaping and shell materials as well as colouring information, about compatibility of such modules and their technical specifications.

According to FIG. 1, the individual 1 transmits a subset $I_{1a}$ of the first information to the computer system $3_v$. This subset $I_{1a}$ comprises all information about the individual's non-therapeutical audio needs. Thus, this set of information may comprise needs for noise reduction, needs for normal hearing improvement etc. The individual 1 further communicates to the computer system $3_v$ the third information $I_3$ as defined above, namely about individual's non-audio needs.

The additional subset $I_{1b}$ of first information $I_1$, especially audiological diagnostic data for conceiving a hearing aid device, the second information $I_2$ about three-dimensional shape of individual's application area and the fourth information $I_4$ about technical feasibility is applied by a set of information I as a function of $I_{1b}$, $I_2$ and $I_4$ to the computer system $3_v$.

Under the generic aspect of FIG. 1 it is only of secondary importance how and by which communication technique the set of information I is finally transmitted to and treated by the computer system $3_v$. The visualizing computer $3_v$ may be just a front end computer only for visualizing purposes, whereby information treating and calculating computer power is installed in a remote treating computer $3_t$. Computer $3_v$ may even just be a handy, a PDA with online communication to the treating computer $3_t$. In other cases the computing power of computer $3_t$ is incorporated in visualizing computer $3_v$.

The information set I is thereby communicated to the respective computer $3_v$ and/or $3_t$ online via a communication network as via an internet-kind network or via a data carrier as by CD or tape etc. input e.g. by the individual 1.

The information $I_{1a}$, $I_3$ is input by the individual—or a consultant person—to computer $3_v$, which, if the computing power is remote, as at computer $3_t$ provides for communicating this information thereto.

With the help of the set of information I and the information $I_{1a}$, $I_3$ a hearing device adapted to the individual is conceived and visualized on the screen of the visualizing computer system $3_v$. The individual 1 communicates with the system $3_v$ up to the point, where the individual is satisfied with the three-dimensional representation and the additional data of the intended, still conceptual hearing device as displayed on visualizing screen $3a$. Amended information input by the individual 1, e.g. menu-controlled, is recognized by the computer system $3_v$ and/or $3_t$ and an amended proposition of the hearing device is three-dimensionally displayed, still as a function of the non-individual input set of information I.

On approval of the visualized hearing device concept on screen $3a$ of the visualizing computer system $3_v$, the individual 1 inputs an approval indication signal APR to the computer system $3_v$, which causes all the instantaneous hearing device concept data to be frozen, as e.g. stored in a storage 5. This is represented in FIG. 1 schematically by approval closing a storing control switch S to a storage unit 5. Again such storage 5 may be provided at system $3_v$ and/or $3_t$.

The frozen or stored constructional data CONSTR# are now ready to be utilized for constructing the individual's hearing device.

Most important for this basic concept forming part of all variants of inventive hearing device manufacturing is the visual communication VIS of the individual 1 with a visualizing screen $3a$, visualizing the hearing device concept three-dimensionally and whereat the individual may apply for changes, especially with respect to non-therapeutical audio needs as of $I_{1a}$ and/or further non-audio needs as of $I_3$, up to approving the displayed three-dimensional hearing device concept.

Figure 2:
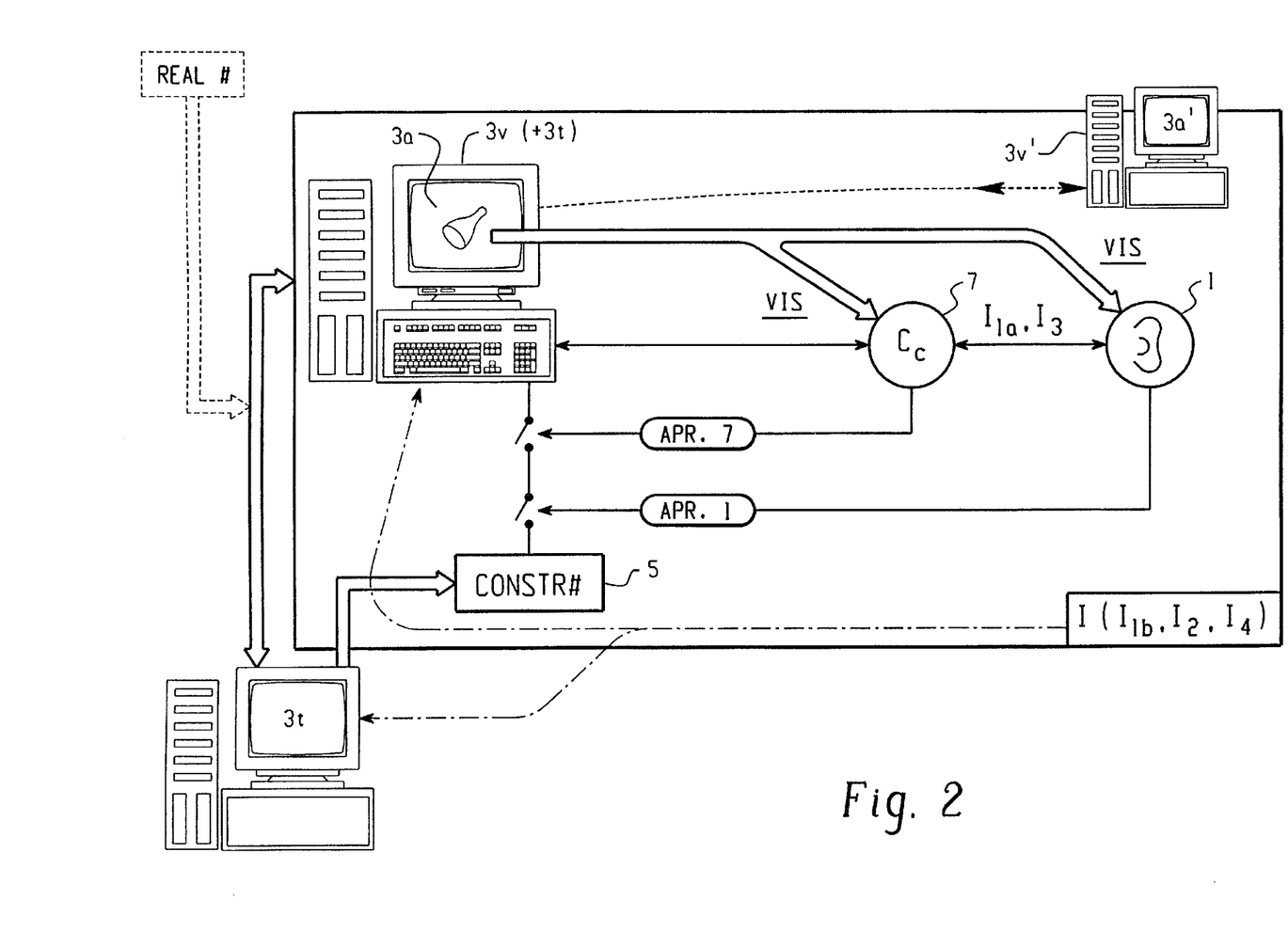
FIG. 2: in a representation in analogy to that of FIG. 1, a preferred mode of realization of the inventive method, whereat a consultant center joins in with the individual for conceiving a hearing device.

Departing from the principal as explained with the help of FIG. 1, FIG. 2 shows a today most preferred variant of this procedure.

Thereby, the visualizing computer system $3_v$, which may be the hearing device conceiving computer or may be a remote or "slave" computer communication with a hearing aid conceiving computer $3_t$, is located at a consultant center $C_c$ 7, Such a consulting center $C_c$ is preferably at a retailer's place. The visualizing system $3_v$ (+$3_t$) is thereby operated by staff of the consultant center 7, whereby during conceiving the hearing device the individual 1 is preferably personally present. Thereby, the first information subset $I_{1a}$ and the third information $I_3$ is communicated from the individual 1 to the staff, who inputs such information data to the visualizing computer system $3_v$. Thereby, the hearing device is conceived under visualized control of the individual 1 and the staff of the consultant center 7.

Nevertheless, it is also possible to have the individual 1 remote from the consultant center 7 and to have the same display $3a$ on the slave remote computer display $3_a'$ at the remote place of the individual. In such case there is a first visualizing computer $3_v$ at the center 7 and a second one, $3_v'$ at the individual's place. As shown by dashed line, the individual 1 may thereby input the information $I_{1a}$, $I_3$ by remote communication to the consultant center, i.e. directly to the visualizing computer system $3_v$ there, or even directly to a remote hearing device conceiving computer system $3_t$ and may possibly additionally be in audio communication with the staff of the consultant center 7 as by phone.

Thereby, and as was already explained with the help of FIG. 1, the additional set of information I is taken into account when conceiving the hearing aid device, this set of information I or parts thereof being fed to the staff of the consultant center 7 and/or directly to the visualizing computer system $3_v$, or, if different therefrom, to a remote hearing device conceiving computer system $3_t$. In FIG. 2 a possibly provided remote hearing device conceiving computer system $3_t$ is shown, which communicates with the visualizing computer system $3_v$ for receiving all the information $I_{1a}$, $I_3$ from the individual 1, and possibly all, or at least a part of the information set I, if that information is present at the center 7.

Once the individual 1 approves APR.1 on the three-dimensionally visualized hearing device, as was explained with the help of FIG. 1, conceived at the visualizing computer system $3_v$ and/or at a remote conceiving computer system $3_t$, the constructional data CONSTR.# for the hearing device as approved are frozen, as e.g. stored in store 5 e.g. at one of the computer systems $3_v$ and/or $3_t$. Such freezing of the constructional data CONSTR.# may be bound to additional approval APR.7 by the staff of the consultant center 7.

Figure 3:
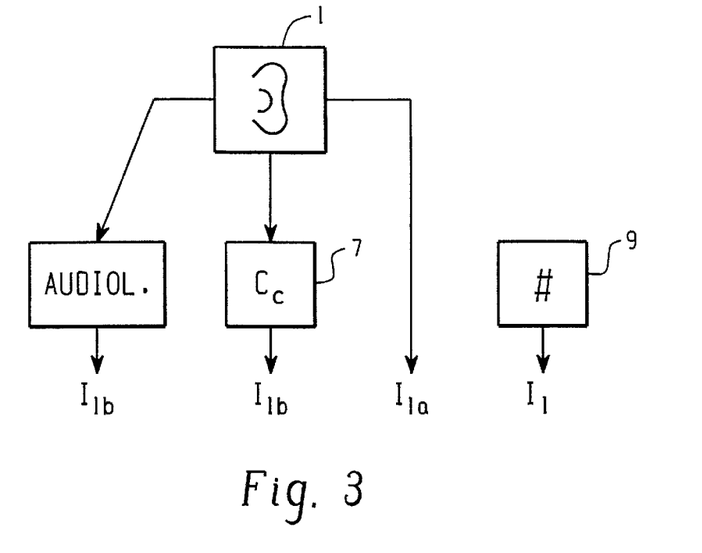
FIG. 3: by means of a flow-chart diagram, different possibilities of retrieving first information to be considered when conceiving the hearing device according to the FIG. 1 or 2.

In FIG. 3 there is schematically shown, how the first information $I_1$ as defined above is possibly retrieved. As the first information $I_1$ indicates individual audio needs, the source of that information is the individual 1. The subset of first information $I_{1b}$, i.e. that information about therapeutical needs of the individual 1, is recovered, in one possibility, by an audiologist AUDIOL. or a medical doctor specialized on diagnosis of hearing behavior and equipped with the respective apparatus for diagnostic measurements. Therefrom the subset $I_{1b}$ is retrieved. Nevertheless, this subset of information $I_{1b}$ may also be retrieved directly at the consultant center 7, as was introduced in FIG. 2, if the respective manpower and equipment is available there. The subset of first information $I_{1a}$ is directly retrieved from the individual 1.

Whenever there is no need to construe a completely new hearing device, but an existing hearing device is to be updated or repaired, then at least a part of the first information $I_1$ may be retrieved from a data bank as shown at 9 of FIG. 3, which data bank may be located e.g. at the hearing device manufacturer, at the consultant center 7 as examples, or even may be provided at the individual 1, so e.g. on an identifying chip card or even within the former hearing device, wherein all data according to the first information $I_1$ for the former device is stored.

Providing such a data bank 9 for the first information remote from the individual 1, but—as will be shown—also for the other categories of information, and by installing communication and addressing capabilities to address such data bank 9 via a worldwide network as by internet, it becomes possible to update or repair an individuals hearing device practically everywhere in the world by retrieving the identifying data, e.g. at an abroad consulting center.

Figure 4:
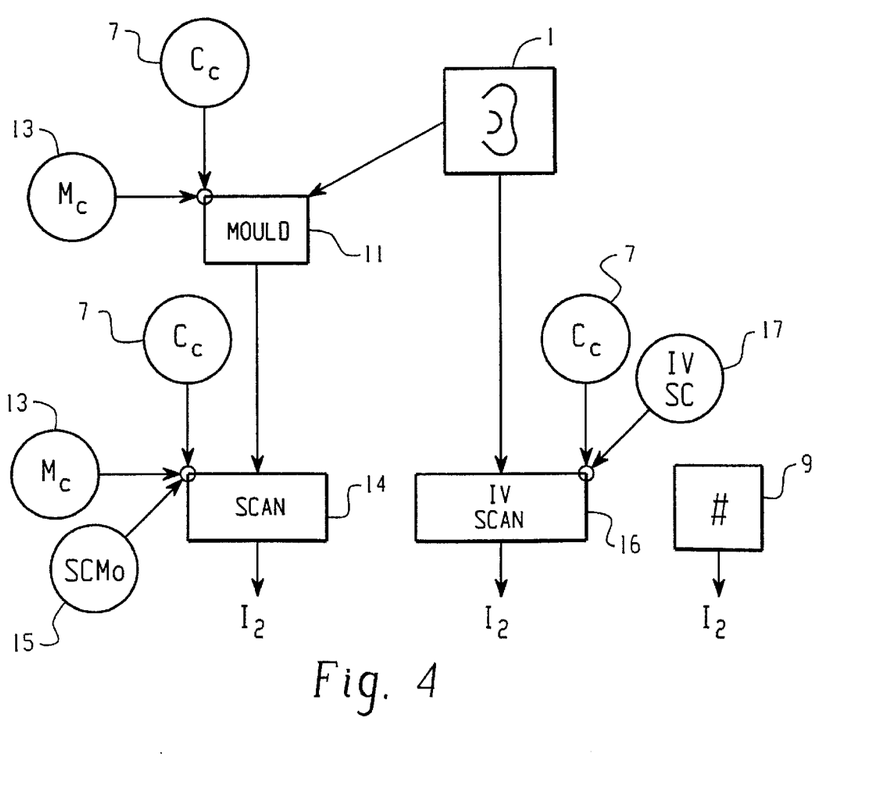
FIG. 4: in a representation according to that of FIG. 3 retrieving of the second information.

In FIG. 4 there is schematically shown retrieving of the second information $I_2$, i.e. about three-dimensional shape of the individual's application area. Again the source of such information is clearly the individual 1.

In a first embodiment a mould 11 is taken from the individual's application area, which may be done, as schematically represented in FIG. 4, e.g. at the consulting center 7, or at a specialized mould center 13. The mould 11 is then scanned as shown by functional block 14 of FIG. 4. Scanning the mould 11 may be done at the same location, where the mould 11 is taken or may be done remote from that location, in a specialized mould scanning center 15, whereby the mould 11 is sent to such a scanning center 15. Thus, scanning may be realized, in a preferred mode, at the consulting center 7, or at the mould center 13, or at the mould scanning center 15.

There results from the mould scanning 14 the second information $I_2$ about three-dimensional shape of the individual's application area.

In a further embodiment, as also shown in FIG. 4, the application area of the individual 1, be it for outside-the-ear hearing devices the area around the ear or the ear itself, or, for inside-the-ear hearing devices, the ear channel, is in-vivo scanned three-dimensionally at an in-vivo scanning center 16. Such a scanning center 16 may again be installed at the consulting center 7 or at a specialized in-vivo scanning center 17. From such in-vivo scanning 16 there results the three-dimensional information data $I_2$ of individual's application area.

Here again, whenever there is no need to construe a completely new hearing device, but there is rather the need to update or repair or newly adapt an existing hearing device, the second information $I_2$ has already been retrieved for conceiving the existing hearing device. In this case for the said repair or updating, reference is taken on data bank 9 according to that of FIG. 3, wherein the three-dimensional information about individual's application area is stored too.

Figure 5:
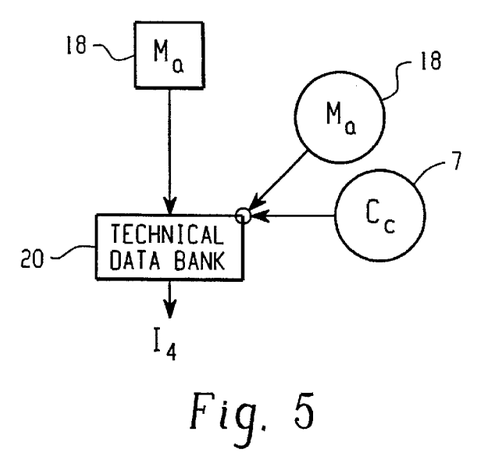
FIG. 5: in a representation according to that of the FIGS. 3 and 4, retrieving of the fourth information.

Turning now to FIG. 5, retrieval of the fourth information $I_4$ is schematically shown. From the manufacturer or the different sub-manufacturers 18 of hearing devices data about hearing device feasibility as defined above is deposited in a technical data bank 20. This data bank 20 may be located at the manufacturer 18 itself, or at the consultant center 7. From this data bank 20 the necessary information $I_4$ about feasibility of hearing devices is retrieved.

Turning back to the representation of FIG. 2 during conceiving a novel hearing device or upgrading or repairing an existing hearing device, it might be advantageous for the staff of the consulting center 7 to on-line communicate with external resources, as e.g with a hearing device manufacturer. In such a case, preferably the computer system $3_v$, which provides for visualizing the hearing device concept to the individual, and one or more than one additional remote computer systems are in on-line communication, so that experts at the remote computer systems as e.g. at the manufacturer may advise the hearing device conception. This leads to grouping two or more than two specialized experts in a conference manner to assist in conceiving an optimum hearing device for the individual.

After this procedure of hearing device conceiving and as was schematically shown in the FIGS. 1 and 2, data CONSTR.# which defines for the hearing device concept are ready for being the basis of subsequent hearing device hardware construction.

2. Manufacturing Hardware

In FIG. 6, again in a schematic signal and communication flow/functional block diagram the manufacturing process is shown, departing from the data CONSTR.# as shown at 5 of the FIGS. 1 and 2, which defines for the approved hearing device concept. According to FIG. 6 this data CONSTR# is transmitted to an assembling location 22. The assembling 22 may thereby be executed at the location of the consulting center 7 or at the manufacturer of hearing aid device 18.

Figure 6:
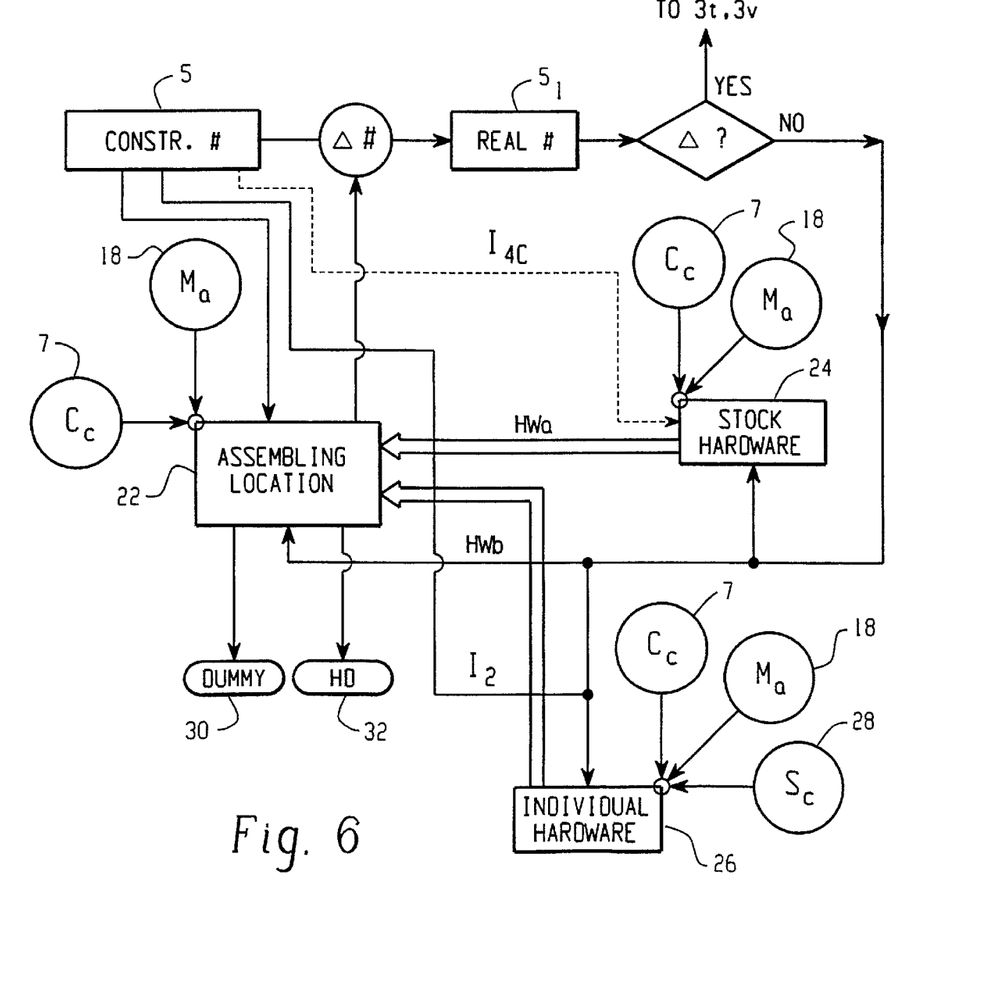
FIG. 6: by means of a simplified communication flow/functional block diagram, a preferred mode of hearing aid hardware construction, based on conceptual data as retrieved according to the FIGS. 1 to 5.

Standard hardware 24 in a stock or manufactured just in time is transmitted $HW_a$ to the assembling location 22. If assembling 22 is performed at the consulting center 7, then preferably stock 24 of standard hardware STHW components is also provided at the consulting center 7. If assembling 22 is performed at the hearing device manufacturer 18, then preferably stock 24 or respective just in time manufacturing is provided at the manufacturer 18 or respective subcontractors of such manufacturer 18.

As was explained before, besides of standard hardware STHW like microphone modules, battery modules, digital processor modules, switches, loudspeaker modules etc., non-standard hardware is also to be incorporated in the individual hearing device as designed. This non-standard and thus individual hardware primarily consists of the hearing device's shell: The shell has to be adapted, according to the second information $I_2$, to the three-dimensional shape of individual's application area. Although and as shown in dashed lines in FIG. 6, it might be advisable to transmit $I_{4c}$, i.e. the definitely selected standard hardware information out of $I_4$, to stock or just in time manufacturing 24, if remote from assembling 22

The definitely selected second information $I_2$ out of CONSTR.# is provided to individual hardware construing 26. This individual hardware construing primarily consists of shell making as was mentioned above. The information $I_2$ is therefore fed to such individual hardware making 26, thereby especially to the shell maker. There an individually adapted shell, which also fits the selected hardware, is construed. This is done in a preferred embodiment by techniques, which are known from rapid prototyping. We thereabout refer to the following patents and patent applications of the applicant, namely to: WO 01/05207.

These techniques allow industrial and commercial manufacturing of individual hearing device shells.

Again, the location of individual hardware making 26 may be at the consultant center 7, or at a specialized shell making center 28, which may be located at the location 18 of the hearing device manufacturer.

As shown in FIG. 6 by double-line arrow, standard hardware $HW_a$ is delivered from standard hardware stock or just in time manufacturing 24 to the assembling 22, whereas individually tailored hardware $HW_b$ is transmitted from individual hardware manufacturing 26 to the assembling 22. This individual hardware is manufactured just in time.

Whenever assembling 22 may be performed exactly matching the conceptual data CONSTR#, assembling 22 results either in a hardware hearing device 32, which exactly accords to the conceptual needs, or possibly first in a dummy hearing device DUMMY30. Clearly for construing a dummy hearing device, only dummy standard modules are built in a shell, if such modules are built in the shell at all. The object of realizing a dummy 30 of a hearing device is to first get approval of the individual on exact matching of the shape to his individual application area, which matching is, under the aspect of comfort for the individual and possibly also of aesthetics, very critical and of high importance.

Thus, there results in this case a hearing device dummy 30 or a hearing device 32, which respectively match with the information CONSTR#.

During assembling and/or readying the hardware at stock or just in time production 24 and/or individual hardware production 26, the case may arise where the conceptual data CONSTR# may not be exactly fulfilled. In this case the involved instances as assembling 22 and hardware providers 24, 26 target at a solution which is closest possible to the solution defined by the said data CONSTR. #, whereby different priorities of departing from these approved data CONSTR.# may be fixed. It might be that requirements according to the third information $I_3$, namely not-audio individual needs, may be set on a lower priority with respect to fulfilling than audio information according to the first information $I_1$ and the second information $I_2$ according to the three-dimensional application area data. In all such cases and as shown in FIG. 6, from assembling 22 or possibly also from hardware preparing 24 and/or 26 the approved conceptual data CONSTR# are respectively amended, as schematically shown in FIG. 6 by Δ#. Thereby, there is in fact established an amended set of data REAL#, which has not been approved by the individual. Obviously this data is again stored according to storing or freezing 5 of FIG. 1 or 2 and as shown in FIG. 6 at $5_1$.

If the differences, which have to be made with respect to the approved data CONSTR# are extensive, then there might be not much sense to produce a hearing aid device 32 or even a dummy 30 at all. Thus, in such a "feasible" case the data REAL# are first retransmitted to the visualizing computer system $3_v$ as shown in FIG. 1 of FIG. 2. There, visualization of the hearing device according to the data REAL# is established and the individual 1 once again has the opportunity to either approve or to apply additional changes. In this case a new set of approved constructional data CON- STR# is established. If the amendments or changes of the originally approved data CONSTR# are of minor importance, they form the basis for construing the hearing aid device 32 or the dummy 30.

Up to the point whereat the differences of approved hearing device defining data CONSTR# from data REAL# of a most matching hardware hearing device are small enough, there is established looping between assembling 22 and the individual's approval, thereby minimizing more and more such differences.

Figure 7:
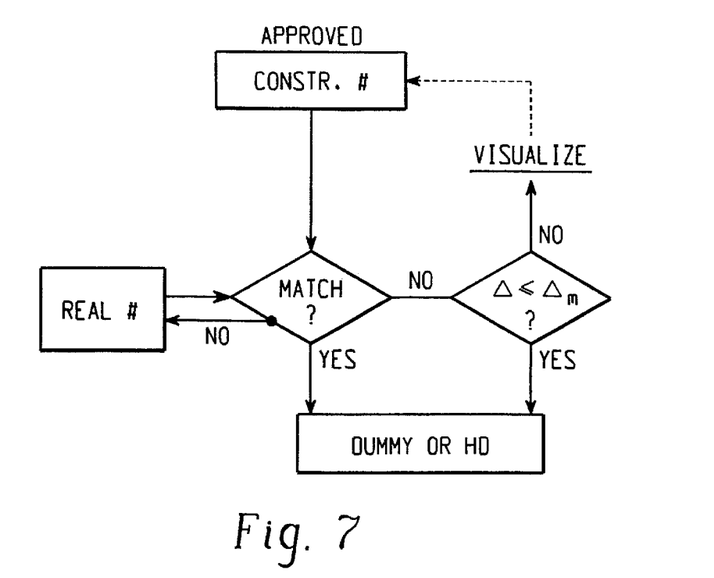
FIG. 7: again by means of a communication flow/functional block diagram or flow-chart, decision taking of construing hardware and/or amending data, for re-approval by the individual in the hardware construing operation according to FIG. 6.

This matching approach procedure is schematically shown in FIG. 7. The approved constructional data CONSTR# are checked with the real constructional data REAL#. If they match, a dummy or a hearing device is construed. If they do not match, it is checked whether the data difference is significant enough to refrain from construing any hardware. Then the real constructional data REAL# are transmitted for visualizing to the individual 1. If such difference is not significant or becomes not significant anymore, then one proceeds to dummy or hearing device hardware production.

After this process there results either a dummy hearing device or a functional "prototype" hearing device.

3. Hardware Approval by the Individual

Figure 8:
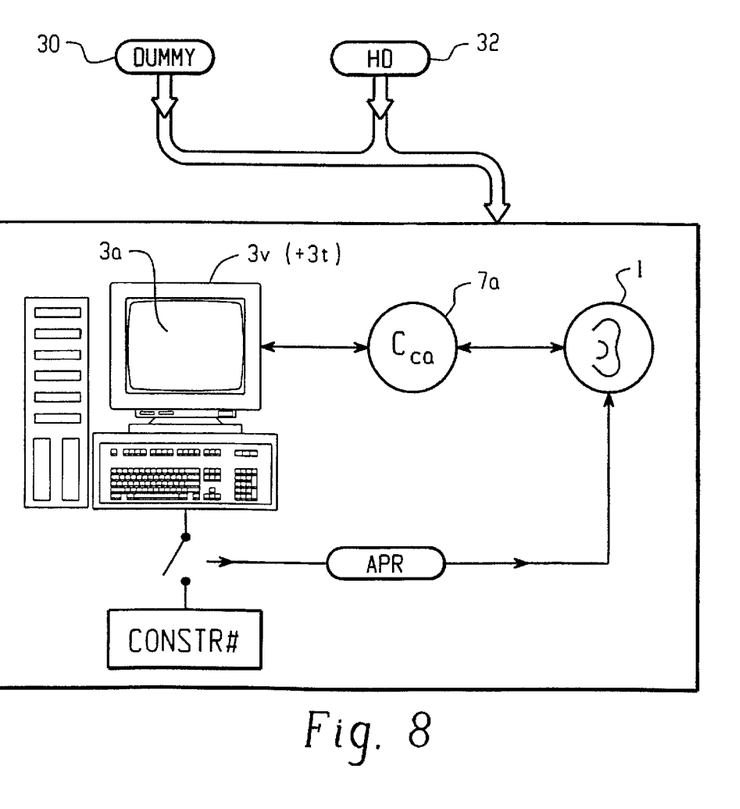
FIG. 8: by means of a representation similar to that of the FIGS. 1 and 2 a preferred embodiment of hardware approval within the inventive method.

In FIG. 8 there is shown in a representation according to that of FIG. 2 how hardware approval is performed by the individual 1. The result of the hardware manufacturing step is, as was explained, a dummy of the hearing device, as shown at 30 of FIG. 6, and/or a functional hearing device 32. The respective hardware, dummy and/or hearing device 30, 32 are transmitted to the place where the individual 1 is personally present at. Therefore, and following the principal of FIG. 1, this hardware is transmitted to the individual 1 directly or, following up the system of FIG. 2 and as shown in FIG. 8, to a consultant center 7a, which needs not necessarily be the same as was used by the individual 1 to conceive the concept of the hearing device and as shown in FIG. 2. Nevertheless, it might be the same consultant center. In any case, be it dummy 30 or hearing device 32, such hardware is personally transmitted to the individual 1, who performs the try-on.

If a dummy has been transmitted then the try-on has the only objects to evaluate whether three-dinmensional shape of the hearing device fits the respective application area at individual's ear being around the ear or the ear itself for outside-the-ear application, or be it the ear channel for inside-the-ear applications and of checking on aesthetic appearance.

If a functional hearing device has been constructed and is transmitted to the individual 1, such try-on will also be directed on the audio-effects of the hearing device, further possibly on handability of switches etc. Again, if the individual 1 does not approve, in the case of a dummy, about shape-fitting and aesthetics, or, in the case of a functional device, additionally on functional characteristics of the hearing device, the individual 1 may again change or amend the data of the hardware device in communication via staff of the consultant center 7a and on screen, i.e. in visual communication with display screen 3a of the visualizing computer $3_v$, which is, as was explained above, possibly combined with conceiving computer $3_r$.

To do so, parallel to transmitting the hardware 30 and/or 32 to the individual 1, the set of data REAL#, which exactly accords with the hardware transmitted, is transmitted finally to the visualizing computer system $3_v$. The individual 1 not only tries on the hardware 30/32, but has also, on screen 3a, the three-dimensional representation of the tried on hardware and may, on disapproval with the hardware, enter, possibly with the help of the staff of the consultant center 7a, desired further amendments.

Thereby and in close analogy to the system as was explained with the help of FIG. 2, there is established a new set of data CONCTR# on approval, especially by the individual 1. Clearly here too, establishing an approved set of data CONCTR# may also be linked to the approval of the staff of consulting center 7a.

This data, i.e. the approved data CONCTR# of FIG. 8, is fed into the manufacturing cycle again, as shown at 5 of FIG. 6.

Thus, by the inventive concept of a method for producing hearing aid devices there is established an intense interaction between the individual 1 and conception, then construction of his individual hearing device. This is established by the fact that the individual 1 is personally involved in these conception and construction procedures by getting the opportunity to watch an screen his personal hearing device already in the conceptual phase and also later for possible corrections on a dummy or hearing aid "prototype". Clearly, such prototype may be definite, if according to FIG. 8 the individual directly approves on the hearing device 32, which was transmitted to him as a result of first constructional attempt.

What is claimed is:

1. A method for designing and manufacturing a hearing device individually for an individual, comprising the steps of:

designing a concept of the hearing device by a computer system as a function of
   a first information about individual audio needs;
   second information about three-dimension shape of the application area for the hearing device at the individual;
   third information about individual input on non-audio needs for the hearing device; and
   fourth information about feasibility of hearing devices;
three-dimensionally visualizing the concept of the hearing device designed as a function of said first to fourth information by display means to the individual and amending of said visualized concept controlled by said individual;
freezing data defining for said visualized concept of said device on approval by said individual or by a person authorized by said individual after individual approval for subsequent realization of hearing device hardware; and
manufacturing said device in dependency of said frozen data.

2. The method of claim 1, further comprising visualizing and designing said hearing device as a function of said first to fourth information at one local computer system.

3. The method of claim 1, further comprising visualizing and designing said hearing device as a function of said first to fourth information at more than one decentralized computer systems being in mutual communication.

4. The method of claim 3, at least two of said decentralized computer systems being in real-time communication.

5. The method of claim 3, further comprising visualizing said concept to said individual by a computer system controlled as a slave computer system by a further computer system or by a PDA screen or a handy screen respectively controlled by said further computer system.

6. The method of claim 1, further comprising visualizing and controlling said concept by said individual at the location of a consultant.

7. The method of claim 6, wherein said consultant is a hearing device retailer.

8. The method of claim 1, further comprising subdividing said first information into a first subset of information about therapeutical audio-needs of the individual and a second subset of information about non-therapeutical audio-needs of the individual, and retrieving said second subset of information for designing said hearing device from said individual.

9. The method of claim 1, further comprising the step of retrieving at least a part of said first information at a place remote from said visualizing.

10. The method of claim 1, further comprising retrieving at least a part of said first information at the place of said visualizing.

11. The method of claim 10, thereby selecting said place to be the place of a consultant.

12. The method of claim 11, said place of said consultant being the location of a hearing device retailer.

13. The method of claim 1, further comprising retrieving at least a part of said first information from a data bank established from data of a previous hearing device of said individual.

14. The method of claim 1, further comprising retrieving said second information by taking a mould of said application area.

15. The method of claim 14, further comprising taking said mould at a specialized mould center or at the location of a consultant.

16. The method of claim 15, wherein said place of said consultant is the location of a hearing device retailer.

17. The method of claim 14, further comprising three-dimensionally scanning said mould.

18. The method of claim 17, further comprising performing said mould scanning at a specialized scanning center or at a specialized mould-taking center or at the location of a consultant.

19. The method of claim 18, wherein said location of said consultant is the location of a retailer.

20. The method of claim 1, further comprising retrieving said second information by in-vivo scanning three-dimensionally said individual's application area.

21. The method of claim 20, further comprising performing said in vivo scanning at a specialized in vivo scanning center or at a consultant's place.

22. The method of claim 21, wherein said consultant's place is the location of a hearing device retailer.

23. The method of claim 1, further comprising retrieving at least a part of said second information from a data bank comprising data of an existing hearing device of said individual.

24. The method of claim 1, further comprising retrieving said fourth information from at least one hearing device manufacturer.

25. The method of claim 24, further comprising storing said fourth information in a data bank.

26. The method of claim 25, further comprising locating said data bank at said hearing device manufacturer or at a consultant center.

27. The method of claim 26, wherein said consultant center is a hearing device retailer.

28. The method of claim 1, further comprising transmitting said frozen data to a hearing device hardware-manufacturing center.

29. The method of claim 28, wherein said hearing device hardware-manufacturing center is a hearing device manufacturer or a consultant center.

30. The method of claim 29, wherein said consultant center is at a hearing device retailer's location.

31. The method of claim 28, wherein at said manufacturing center there is checked whether a hearing device exactly matching said frozen data may be realized or not.

32. The method of claim 31, wherein whenever a hearing device exactly matching said frozen data may not be constructed, there is conceived data at said assembling center of a hearing device, which may be realized and which matches closest said frozen data.

33. The method of claim 32, wherein said data of said hearing device matching closest is retransmitted and a hearing device, which accords with said retransmitted data is visualized to said individual for re-approval and freezing or for further amendment.

34. The method of claim 31, wherein there is construed at said manufacturing center a dummy of a hearing device or a functional hearing device, closest possible matching said frozen data.

35. The method of claim 34, further comprising transmitting said dummy and/or said functional hearing device to said individual.

36. The method of claim 35, thereby transmitting the data defining for said dummy and/or said functional hearing device for visualizing said transmitted dummy and/or functional hearing device to said individual for further amendment and approval.

37. The method of claim 28, wherein at said manufacturing center a dummy of a hearing device according to said frozen data or a shell of a functional hearing device according to said frozen data is construed by means of an additive build-up process as known from rapid prototyping.

38. The method of claim 28, wherein said manufacturing center is located at the location of a consultant center or at a hearing manufacturer.

39. The method of claim 38, wherein said consultant center is a retailer for hearing devices.

40. The method of claim 1, wherein said hearing device is a hearing aid device.

* * * * *